United States Patent
Ries et al.

(10) Patent No.: US 7,293,285 B2
(45) Date of Patent: *Nov. 6, 2007

(54) METHOD AND SYSTEM FOR PROVIDING FIELD SCALABILITY ACROSS A STORAGE PRODUCT FAMILY

(75) Inventors: James Lee Ries, Boulder, CO (US); Daniel James Plutt, Superior, CO (US); Jon H. Benson, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 382 days.

This patent is subject to a terminal disclaimer.

(21) Appl. No.: 11/084,500

(22) Filed: Mar. 18, 2005

(65) Prior Publication Data

US 2005/0166029 A1 Jul. 28, 2005

Related U.S. Application Data (63) Continuation of application No. 09/750,899, filed on Dec. 28, 2000, now Pat. No. 6,918,040.

(51) Int. Cl.
*G06F 12/00* (2006.01)
*H04L 9/32* (2006.01)

(52) U.S. Cl. .......................... 726/16; 726/27; 711/100

(58) Field of Classification Search ................ 713/191; 711/100; 717/168; 700/214; 710/315; 726/16, 726/27

See application file for complete search history.

(56) References Cited

U.S. PATENT DOCUMENTS

| | | | |
|---|---|---|---|
| 5,418,837 A | 5/1995 | Johansson et al. |
| 5,530,753 A | 6/1996 | Easter et al. |
| 5,671,281 A | 9/1997 | Campbell et al. |
| 5,925,119 A | 7/1999 | Maroney |
| 6,058,478 A | 5/2000 | Davis |
| 6,487,474 B1 | 11/2002 | Goodman et al. |
| 6,532,402 B2 | 3/2003 | Ostwald et al. |
| 6,609,046 B2 | 8/2003 | Ostwald et al. |

FOREIGN PATENT DOCUMENTS

| | | |
|---|---|---|
| EP | 0 583 077 A1 | 7/1993 |
| EP | 0 701 106 A1 | 8/1995 |

*Primary Examiner*—Hosuk Song
(74) *Attorney, Agent, or Firm*—Brooks Kushman P.C.

(57) ABSTRACT

Methods and systems for upgrading a storage library of a product line having a hardware component such as a storage array operable to run at low and high operating levels in which the hardware component is set to operate at the low operating level includes associating a software key with the storage library. The software key has permission instructions for the hardware component to operate at the high operating level. The hardware component is enabled to operate at the high operating level in response to the software key being associated with the storage library in order to upgrade the storage library.

18 Claims, 4 Drawing Sheets

METHOD AND SYSTEM FOR PROVIDING FIELD SCALABILITY ACROSS A STORAGE PRODUCT FAMILY

CROSS-REFERENCE TO RELATED APPLICATIONS

This application is a continuation of U.S. application Ser. No. 09/750,899, filed Dec. 28, 2000, now U.S. Pat. No. 6,918,040.

BACKGROUND OF THE INVENTION

1. Field of the Invention

The present invention relates generally to methods and systems for upgrading data storage products such as storage libraries and, more particularly, to a method and system for upgrading a storage library having a disabled enhanced hardware feature which is enabled upon an upgrade mechanism enabling the disabled enhanced hardware feature.

2. Background Art

Automated storage libraries are capable of storing and retrieving large quantities of information stored on media cartridges. This is accomplished by the use of a large number of cartridge storage cells, each of which houses a media cartridge, that are housed within an enclosure. Such storage libraries use a robotic mechanism to quickly move the media cartridges between their media cartridge storage cells and media cartridge players. For example, to retrieve information that is stored on a selected media cartridge, a robotic mechanism moves to a location opposite the media cartridge storage cell that houses the selected media cartridge. An end effector of the robotic mechanism then grasps the media cartridge and extracts it from the media cartridge storage cell to a media player where the end effector loads the media cartridge into the media player.

Storage libraries in a product line typically have a common base unit with differing options. For example, the type and capacity of cartridge storage cells, the type and amount of media players, and the robotic mechanism capability may all be varied. In the manufacturing and configuration process, each storage library model is setup differently (e.g., 10 vs. 20 cartridge storage capability, 2 vs. 4 media players, single vs. multiple robotic mechanisms, advanced vs. basic media players, larger vs. smaller frames, etc.).

Having multiple options available as different modes requires additional development and manufacturing overhead to assemble and test similar albeit different storage libraries. For the storage library consumer upgrading can be a daunting, if not impossible, task requiring specialized skills. Some manufacturers do not support upgrading for the same reasons. Other manufacturers support upgrading by requiring field installs to upgrade or expand the storage libraries.

Further, storage libraries of different product lines within a product family also have differing options. For instance, a storage library of a first product line may have a low maximum storage capacity while a storage library of a second product line may have a high maximum storage capacity.

What is needed is a method and system for upgrading a storage product such as a storage library in which a manufacturer builds a highly reliable cost effective complete product and then provides an upgrade path independent of the storage library hardware.

SUMMARY OF THE INVENTION

Accordingly, it is an object of the present invention to provide a method and system for providing field scalability across a storage product family.

It is another object of the present invention to provide a method and system for upgrading a storage library having a disabled enhanced hardware feature which is enabled upon an upgrade mechanism such as a software module enabling the disabled enhanced hardware feature in order to upgrade the storage library.

It is a further object of the present invention to provide a method and system for upgrading a storage library having a relatively low hardware operating performance level and disabled higher hardware performance levels in which one of the higher hardware performance levels is enabled and becomes the hardware operating performance level upon an upgrade mechanism such as an EEPROM module attached to the storage library triggering the enablement of the higher hardware performance level in order to upgrade the storage library.

It is still another object of the present invention to provide a method and system for upgrading a storage library having hardware supporting low and high storage capacity operating levels in which the high storage capacity operating level is initially disabled and then becomes enabled upon an upgrade mechanism such as a software module having permission data triggering the enablement of the high storage capacity operating level in order to upgrade the storage library.

It is still a further object of the present invention to provide a method and system for upgrading a storage library having hardware supporting low and high media player operating levels in which the high media player operating level is initially disabled and then becomes enabled upon an upgrade mechanism triggering the enablement of the high media player operating level in order to upgrade the storage library.

It is still another object of the present invention to provide a method and system for upgrading a given storage product of a product line in which each storage product in the product line is capable of a high level of functionality but the given storage product is configured by software to operate at a low level of functionality and then upgraded to operate at the high level of functionality upon the software receiving permission to upgrade the given storage product from an upgrading mechanism.

It is still a further object of the present invention to provide a method and system for upgrading a given storage library of a product line in which each storage library in the product line includes identical hardware capable of different functionality levels and an external module containing basic permission for enabling one of the lower functionality levels to be the operating level and advanced permission for enabling one of the higher functionality levels to replace the lower functionality level and become the operating level in order to upgrade the storage library.

It is still another object of the present invention to provide a method and system for upgrading a storage library of a first product line having a low maximum storage capacity to a storage library of a second product line having a high maximum storage capacity.

In carrying out the above objects and other objects, the present invention provides a method of upgrading a storage library. The method includes providing with a storage library a hardware component which has requisite hardware elements used for running the hardware component either at low or high operating levels. The amount of the requisite hardware elements used for running the hardware component at the high operating level is greater than the amount of the requisite hardware elements used for running the hardware component at the low operating level. The hardware component is set to run at the low operating level until a software key having permission instructions for the hardware component to run at the high operating level is associated with the storage library. The hardware component is enabled to run at the high operating level in response to the software key being associated with the storage library thereby upgrading the storage library.

The method may further include associating an enabling mechanism with the storage library. The enabling mechanism contains permission instructions for the hardware component of the storage library to run at the low operating level. The enabling mechanism updates the permission instructions for the hardware component to run at the high operating level upon the software key being associated with the storage library.

The hardware component may include a storage array for storing media of the storage library; a set of media players for performing operations on media of the storage library; or a robotic mechanism for manipulating media of the storage library.

Associating the software key with the storage library may include attaching an upgrade module (such as an EEPROM module) having the software key to the storage library. Associating the software key with the storage library may include transferring the permission instructions of the software key from the Internet to the storage library.

In carrying out the above objects and other objects, the present invention also provides a system of upgrading a storage library. The system includes a hardware component provided with a storage library. The hardware component has requisite hardware elements used for running the hardware component either at low or high operating levels. The amount of the requisite hardware elements used for running the hardware component at the high operating level is greater than the amount of the requisite hardware elements used for running the hardware component at the low operating level. The hardware component is set to run at the low operating level until enabled to run at the high operating level.

The system further includes a software key and an enabling mechanism. The software key has permission instructions for the hardware component of the storage library to run at the high operating level. The enabling mechanism enables the hardware component of the storage library to run at the high operating level in response to the software key being associated with the storage library thereby upgrading the storage library.

The enabling mechanism may contain permission instructions for the hardware component of the storage library to run at the low operating level. In this case, the enabling mechanism updates the permission instructions for the hardware component to run at the high operating level upon the software key being associated with the storage library.

In carrying out the above objects and other objects, the present invention also provides a method of upgrading a storage library. The method includes associating a base module with a storage library provided with a first storage frame having a first storage capacity. The base module has permission instructions for the storage library to operate at the first storage capacity. The permission instructions of the base module are accepted by the storage library such that the storage library operates at the first storage capacity upon the base module being associated with the storage library.

The method further includes replacing the first storage frame with a second storage frame having a second storage capacity greater than the first storage capacity. A software key, having permission instructions for the storage library to operate at the second storage capacity instead of the first storage capacity, is then prompted to be associated with the storage library in response to recognizing the permission instructions of the base module for the storage library to operate at the first storage capacity after the first storage frame has been replaced with the second storage frame. The software key is then associated with the storage library. The permission instructions of the software key are accepted by the storage library such that the storage library operates at the second storage capacity upon the software key being associated with the storage library after the first storage frame has been replaced with the second storage frame.

The software key may then be disabled after the permission instructions of the software key have been accepted by the storage library. In this case, the permission instructions are written from the storage library into the base module.

The advantages associated with the present invention are numerous. For example, the methods and systems of the present invention enable storage library resellers to manage their inventories more effectively. By using an upgrade module such as an EEPROM module to control storage library capacity, the reseller can shuffle part of the inventory mix by simply exchanging an upgrade module for another capacity instead of having to return the frame of the storage library to the manufacturer.

The above objects and other objects, features, and advantages of the present invention are readily apparent from the following detailed description of the best mode for carrying out the present invention when taken in connection with the accompanying drawings.

DETAILED DESCRIPTION OF THE PREFERRED EMBODIMENT(S)

In general, the present invention is a method and system for upgrading a storage product, such as a storage library, of a product line in which each storage library has identical hardware components, such as a media storage array, a set of media players, robotic mechanism, etc., having different operating levels. For instance, the media storage array may have multiple capacity levels such as capability for holding ten or twenty media cartridges of the same type. The media storage array may also have different types of storage capability such as capability for holding ten media cartridges of one type and ten media cartridges of another type. Similarly, the media players may have different capacity levels such as two or four media players for performing operations on two or four different media cartridges at one time. The media players may include different media player types for performing operations on corresponding different types of media cartridges. The robotic mechanism may be configured to manipulate only one or multiple media cartridges at a time.

The storage libraries of the product line are intended to be sold to consumers by a manufacturer or through a reseller. The manufacturer (or reseller) configures the hardware of the storage libraries to operate at different levels and then prices the storage libraries accordingly. For instance, the hardware component is a media storage array capable of storing up to twenty media cartridges but may be controlled by software to permit certain media cartridge storage capacity levels, i.e., ten or twenty media cartridges. The manufacturer sets the software of the storage library to command the media storage array of a first set of storage libraries in the product line to operate at a low storage capacity level (ten cartridges) even though the media storage array is capable of operating at a higher storage capacity level (twenty cartridges). The manufacturer then sets a relatively low price for each of the storage libraries of the first set of storage libraries in the product line for sale to consumers. The low price reflects the limited storage capacity.

The manufacturer sets the software of the storage library to command the media storage array of a second set of storage libraries in the product line to operate at a high storage capacity level (twenty cartridges), i.e., the highest capacity level that the media storage array can support. The manufacturer then sets a relatively higher price for each of the storage libraries of the second set of storage libraries in the product line for sale to consumers. The higher price reflects the relatively larger storage capacity of the storage libraries.

In essence, the media storage array of each storage library in the product line is an identical media storage array that may be set at different capacity levels. A consumer selects a storage library for purchase depending upon the needs of the consumer with respect to the desired storage capacity level and the budget of the consumer. For instance, if the consumer has a low budget and does not need a higher storage capacity level then the consumer purchases the lower cost storage library having the relatively low storage capacity level (ten cartridges). In the past, if this consumer desired at some point in the future after purchasing the storage library that more storage capacity is desired then the consumer would have to upgrade the storage library by replacing the low capacity storage array with a higher capacity storage array, i.e., replacing a ten cartridge storage array with a twenty cartridge storage array, by exchanging the storage library for a larger storage library, or by performing field installations to add a bigger storage array to the storage library.

The present invention provides a method and system for enabling the consumer to upgrade the lower cost storage library such that the storage library will have a higher storage capacity level. The present invention avoids the prior art upgrading practice by enabling an inherently high capacity storage array operating at a low storage capacity to be upgraded to operate at the high storage capacity.

In operation, the manufacturer gives each consumer purchasing a storage library an electronically erasable programmable read only memory (EEPROM) module. The module contains operating instructions for each hardware component of the storage library that can be upgraded. The module is attachable to the storage library. Functional software of the storage library reads and loads the operating instructions or keys of the module in order to enable the storage library to operate at a certain level and storage capacity. The storage library does not operate without an attached module.

For instance, the module may have operating instructions for permitting the inherently high capacity storage array to operate at a low storage capacity. After deciding to upgrade the storage library for more storage capacity, the consumer purchases an upgrade module having operating instructions permitting the inherently high capacity storage array to operate at a high storage capacity instead of the low storage capacity. The cost of the upgrade module may be a function of the amount of upgrading.

The consumer then replaces the original module with the upgrade module. Upon reading the instructions contained in the upgrade module, the storage library installs the available upgrade keys located in the upgrade module, transferring the new permission codes to the original base module, and disabling the upgrade module. For any installed upgrade key, the storage library unlocks the enhanced feature, i.e., higher storage capacity level of the storage array, and then makes the enhanced feature available to the consumer thereby upgrading the storage library.

The upgrade module may include upgrade keys specific to a particular instance of the product, i.e., the specific storage library purchased by the consumer. As a result, it is possible to preclude the upgrade module from being transferred to another consumer. Similarly, the upgrade process may disable the upgrade module to prevent the upgrade module from being installed without authorization on multiple storage libraries. The upgrade keys of the upgrade module may by produced via a cryptographic function such that they cannot be simply derived even by technically savvy consumers.

Figure 1:
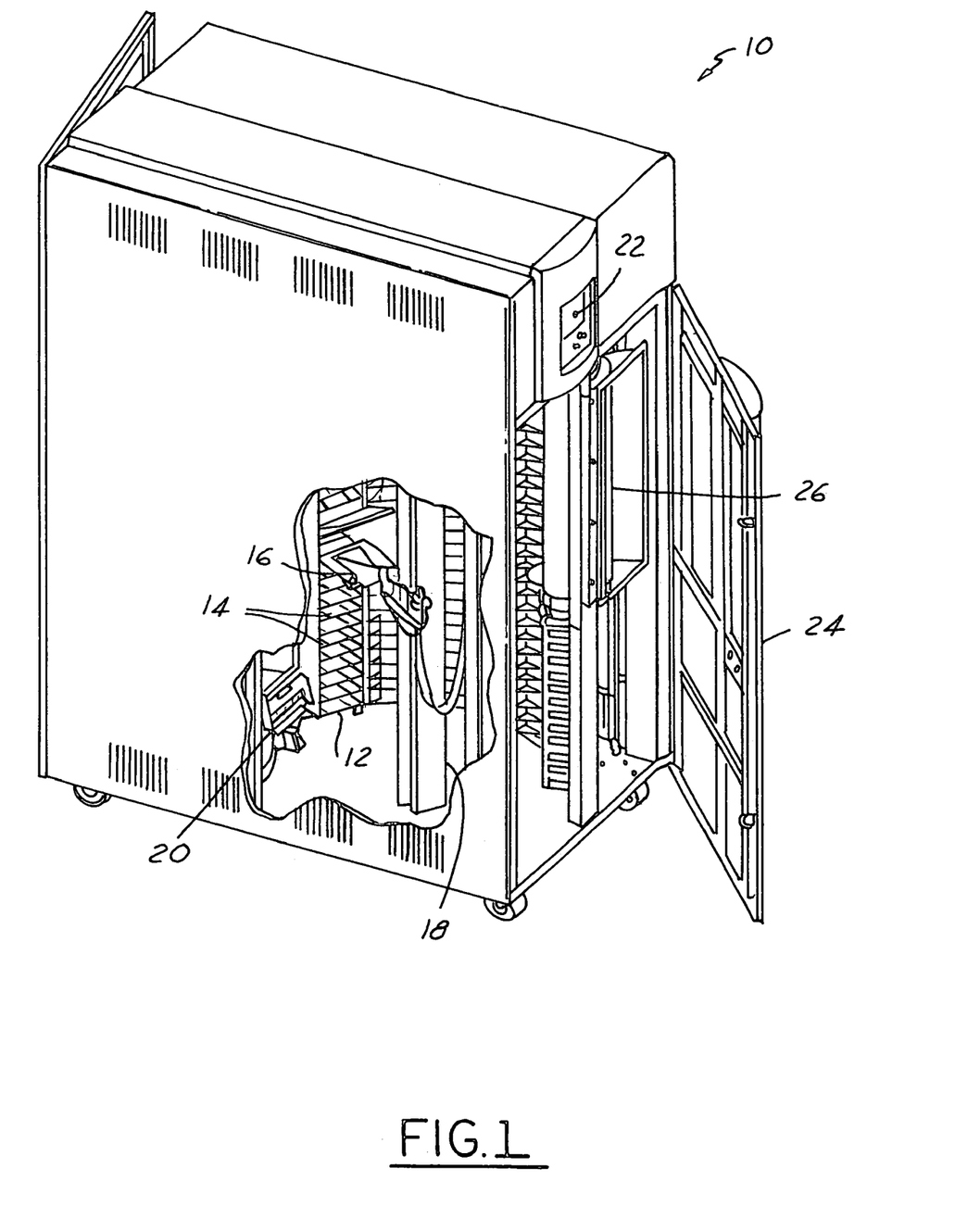
FIG. 1 illustrates an example of an automated storage library for use with the method and system of the present invention.

Referring now to FIG. 1, an example of an automated storage library 10 for use with the method and system of the present invention is shown. Storage library 10 includes a storage frame 12 having an array of media cartridge storage cells 14 for storing media cartridges 16. Storage library 10 further includes a robotic mechanism 18 to enable the storage library to manipulate media cartridges 16. Media cartridges 16 may be of an arbitrary type. Storage library 10 also includes an array of media players 20. Media cartridge storage cells 14 and media players 20 are positioned in vertical columns around robotic mechanism 18. Each media cartridge storage cell 14 is designed to house a single media cartridge 16. Robotic mechanism 18 moves around storage library 10 to access media cartridge storage cells 14 and media cartridge players 20. Robotic mechanisms 18 contain a movable carriage that is capable of transporting robotic components, such as media cartridge pickers, bar code reading devices, and other task oriented sub-modules.

A storage library control unit (controller) 22 is positioned in an exposed area of storage library 10 for access by an operator. Controller 22 is programmable to provide commands to robotic mechanism 18 to manipulate media cartridges 16. Controller 22 may also be in communication with media players 20 for providing commands to mount and dismount media cartridges 16 into and out of the media players. Storage library 10 further includes a front door 24 for allowing and preventing operator access into the interior of the storage library. Storage library 10 further includes a cartridge access port 26 for permitting removal and entry of media cartridges 16 into the storage library.

Figure 2:
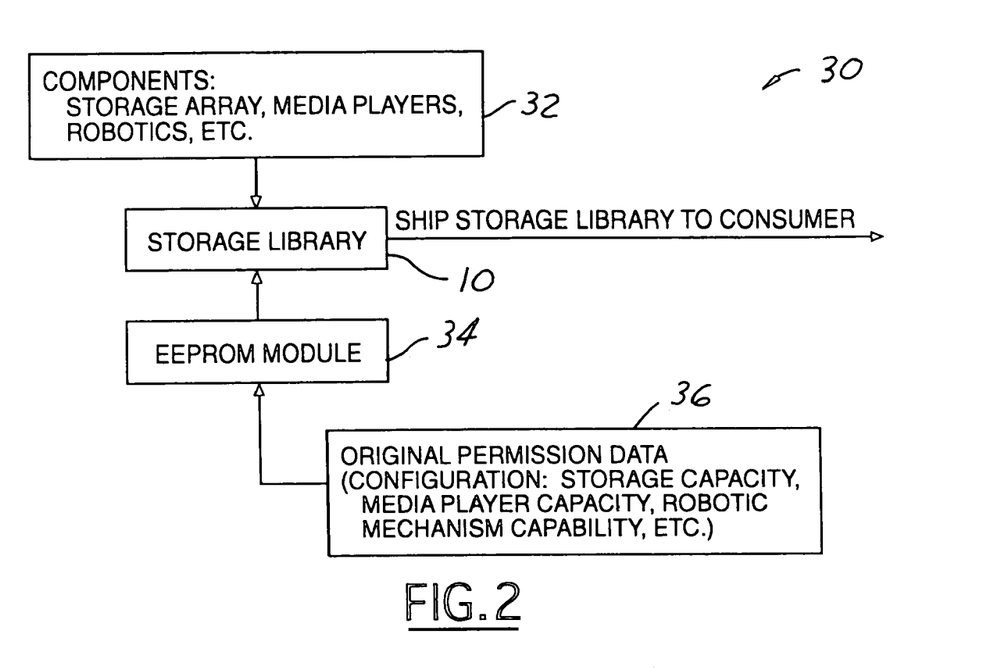
FIG. 2 illustrates a manufacturing process of a storage product of a product line in accordance with the method and system of the present invention.

Referring now to FIG. 2, a manufacturing process 30 of a storage product in a product line in accordance with the method and system of the present invention is shown. As an example, the manufacturing process of storage library 10 is shown in FIG. 2. Each storage library 10 in the product line includes a plurality of hardware features such as a storage array, a set of media players, robotics, etc. as shown in block 32. For example, each storage library 10 in the product line is created with a twenty cartridge capacity storage array, a pair of media players with each media player responsible for performing operations on a distinct media cartridge type, and a robotic mechanism having the capability for manipulating more than one media cartridge simultaneously. As seen by the manufacturer, creating storage libraries having identical hardware components simplifies manufacturing, broadens the target market, and reduces overhead.

Each hardware component of storage library 10 may be capable of different levels of performance. For instance, storage array 14 may operate at ten or twenty media cartridge storage capacity; media players 20 may be configured to handle different types of media cartridge or perform operations on more than one media cartridge simultaneously; robotic mechanism 18 may operate multiple media cartridges simultaneously; and the like.

In order for the manufacturer to sell storage libraries having different levels of functionality (e.g., storage arrays with ten or twenty cartridge storage capacity, a set of media players having one or more functional media players, etc.) some aspects of the functionality can be locked and made unavailable to the consumer. This allows the consumer to purchase a virtual entry level storage library for a reduced cost. The inventory of all hardware options available (though not necessarily enabled) may be displayed on operator panel 22 of storage library 10 for the consumer to view. The inventory of the hardware options can reflect currently installed functions from an original EEPROM module, but can be updated with an upgrade EEPROM module (or upgrade information downloaded to the storage library via the Internet) to reflect subsequently installed functions.

Storage library 10 includes an EEPROM base module 34 which attaches to the storage library. Base module 34 includes operating instructions as shown in block 36 for each hardware component of storage library 10. Each operating instruction instructs the associated hardware component to operate at a certain level of performance. Base module 34 must be attached to storage library 10 for the storage library to function. Storage library 10 includes functional software that reads the operating instructions from base module 34. In response, each hardware component of storage library 10 is configured to operate in accordance with its respective configuration instruction. For example, the operating instruction contained by base module 34 may be to instruct storage array 14 to operate with a ten cartridge capacity storage level even though the storage array can accommodate up to twenty cartridges. Similarly, the operating instruction for the set of media players 20 may be to allow only one media player to operate even though there are more available media players.

Figure 3:
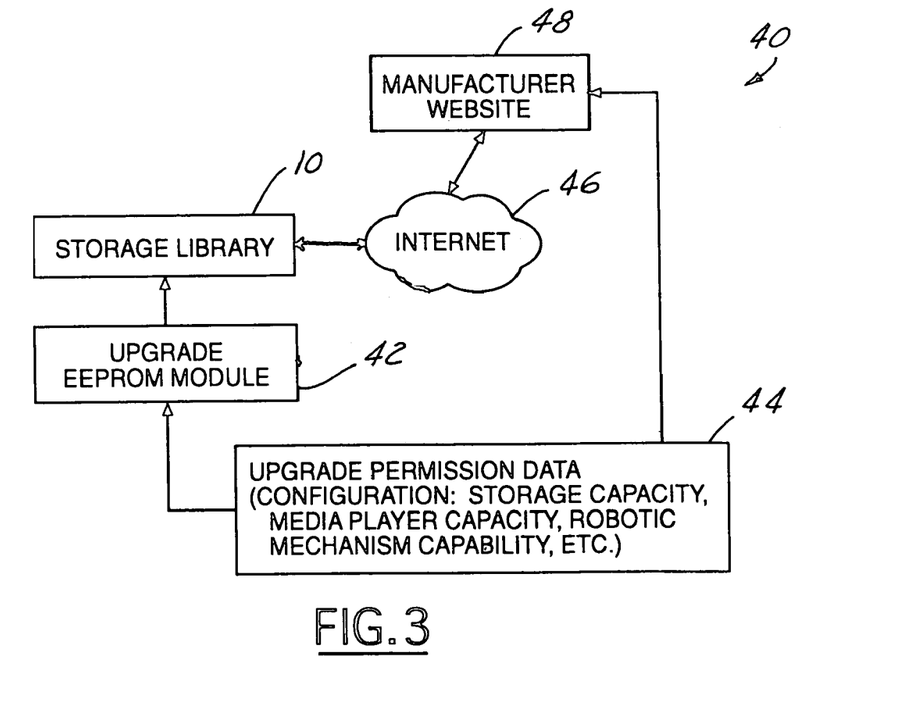
FIG. 3 illustrates an upgrading process of the storage product of the product line shown in FIG. 2 in accordance with the method and system of the present invention.

Referring now to FIG. 3, an upgrading process 40 of storage library 10 in accordance with the method and system of the present invention is shown. In general, when a consumer chooses to upgrade or modify storage library 10 (i.e., upgrading from ten to twenty cartridge storage capacity) the consumer simply purchases an EEPROM upgrade module 42 having a cryptographic upgrade key and then removes base module 34 and attaches upgrade module 42 in its place on the storage library. The cryptographic upgrade key includes a new set of operating instructions for at least one hardware component of storage library 10 as shown in block 44. For instance, the new set of operating instructions contained on upgrade module 42 may include instructions to upgrade storage array 14 to have a higher storage capacity level. Upon reading upgrade module 42, storage library 10 transfers the new set of operating instructions to enable the corresponding hardware feature. The corresponding hardware feature then operates in accordance with the new set of instructions contained in base module 34 which has received the new set of instructions from upgrade module 42. For example, storage array 14 is upgraded to operate at a twenty cartridge storage capacity level instead of the previous ten cartridge storage capacity level.

In effect, upgrade module 42 updates the inventory of options of storage library 10 to function in accordance with the new set of operating instructions. In order to upgrade storage library 10, the new set of operating instructions include permissions data for instructing the hardware components of storage library 10 to operate at a higher functioning level. Because storage library 10 was originally created with the enhanced hardware features disabled, such as storage array 14 capable of accommodating a relatively high number of cartridges but originally restricted to accommodate a lower number of cartridges, those hardware features can be enabled in accordance with the method and system of the present invention without having to perform highly technical installation procedures that are beyond the ability of most consumers.

In addition to attaching an upgrade module 42 having the cryptographic upgrade key with the new set of operating instructions the consumer may directly receive the cryptographic upgrade key over a computer network such as the Internet 46 from an Internet site 48 of the manufacturer. In this case, the cryptographic upgrade key is directly loaded via the Internet 46 into base module 34 and the new permission data are transferred directly into the base module. Base module 34 then enables the hardware components in accordance with the new permission data. In essence, Internet 46 serves as a virtual upgrade key.

The following table illustrates the upgrading process of storage library 10 in accordance with the method and system of the present invention.

|  | BEFORE UPGRADE | AFTER UPGRADE |
| --- | --- | --- |
| Storage Array: | 10 cartridges | 20 cartridges |
| Storage Array: | one cartridge type | multiple cartridge types |
| Media Player: | one cartridge type | multiple cartridge types |
| Media Player: | one cartridge | multiple cartridges |
| Robotic Mechanism: | single cartridge | simultaneous manipulation of multiple cartridges |

As explained above, the values for each hardware component may be contained in a central table of an EEPROM module. At boot time, these values are loaded into storage library 10 from the EEPROM module.

Figure 4:
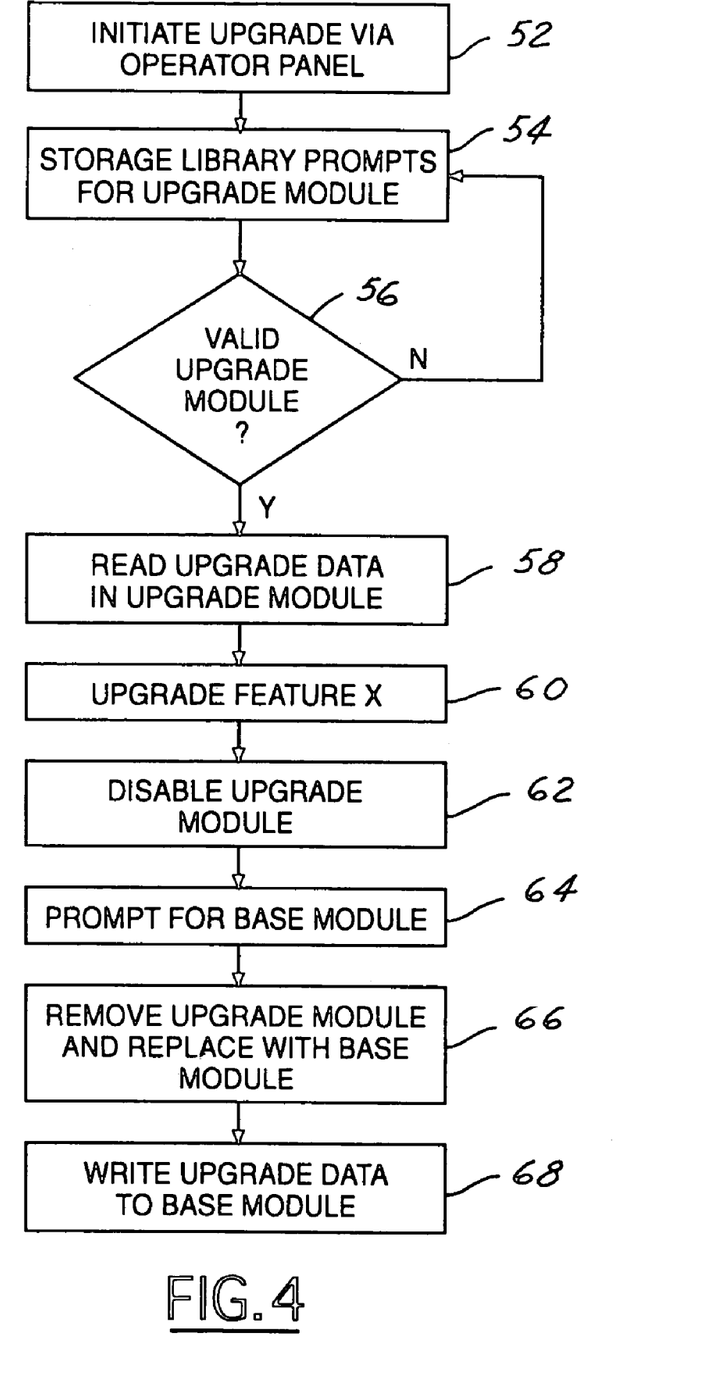
FIG. 4 illustrates a flow chart describing operation of the method and system for updating features of a specific storage library in accordance with the present invention.

Referring now to FIG. 4, with continual reference to FIGS. 2 and 3, a flow chart 50 describing operation of the method and system for updating features of a specific storage library is shown. Initially, storage library 10 includes an EEPROM base module 34 which contains operating instructions for instructing the hardware components of the storage library to operate at a certain level of performance.

Flow chart 50 begins with the operator initiating an upgrade via the operator panel 22 of storage library 10 as shown in block 52. Storage library 10 then prompts for an EEPROM upgrade module 42 as shown in block 54. In response, the operator removes base module 34 and then attaches upgrade module 42 to storage library 10. Storage library 10 then determines if the attached upgrade module 42 is valid as shown in block 56. If upgrade module 42 is valid, storage library 10 then reads the upgrade instructions contained in the upgrade module as shown in block 58. The features of storage library 10 are then upgraded in accordance with the upgrade instructions as shown in block 60.

Upgrade module 42 is then disabled as shown in block 62. Storage library 10 then prompts for base module 34 as shown in block 64. Storage library 10 is configured to not operate unless base module 34 is attached to the storage library. Upgrade module 42 is then removed from storage library 10 and replaced by the operator with base module 34 as shown in block 66. The upgrade instructions are then written to base module 34 as shown in block 68. Storage library 10 may then operate with the upgraded features.

Figure 5:
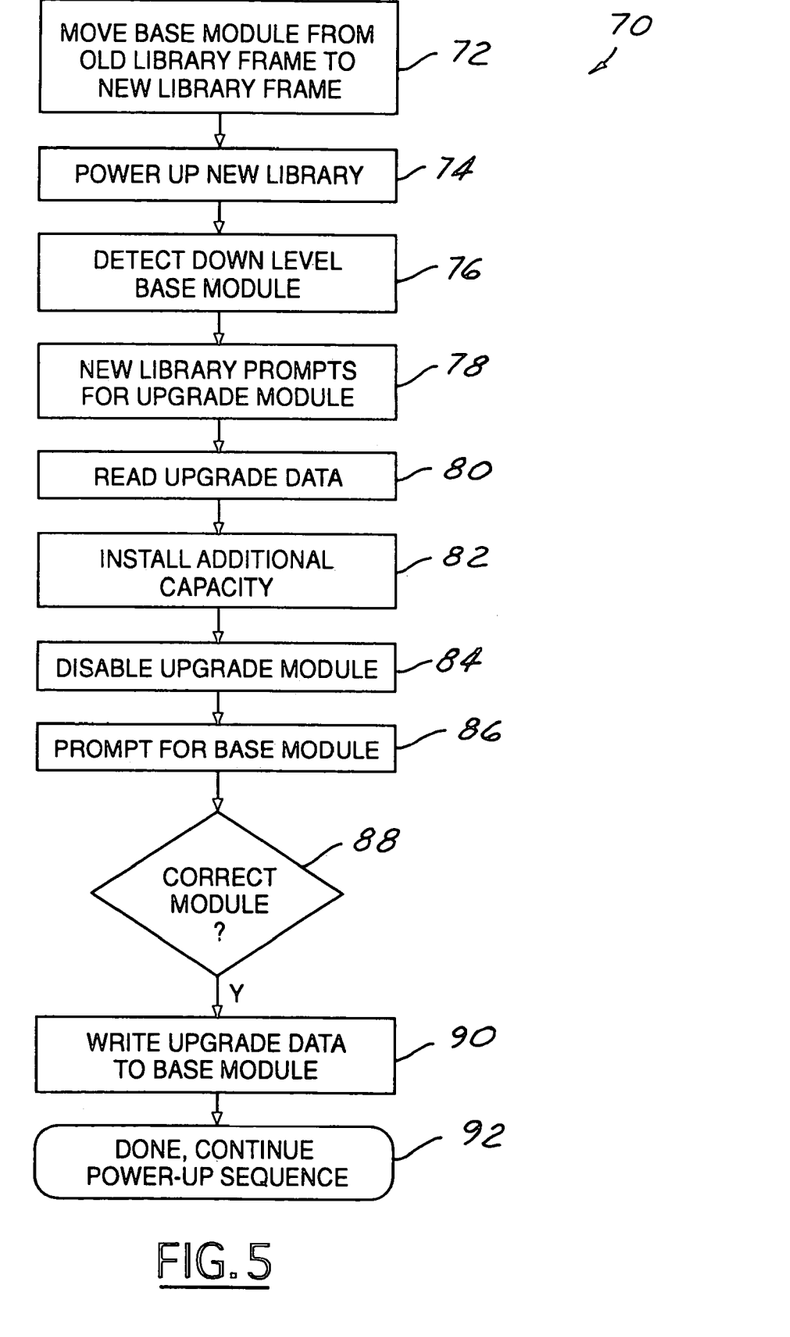
FIG. 5 illustrates a flow chart describing operation of the method and system for upgrading one library frame to another library frame in accordance with the present invention.

Referring now to FIG. 5, with continual reference to FIGS. 2, 3, and 4, a flow chart 70 describing operation of the method and system for upgrading one library frame to another library frame in accordance with the present invention is shown. A storage library with a small frame can provide a low maximum amount of storage capacity and a storage library with a large frame can provide a high maximum amount of storage capacity. Typically, the storage library with a small frame is an old storage library that the operator has used and now needs more storage capacity. Thus, the operator will then need to replace the old storage library with a new storage library having a large frame. Flow chart 70 begins with the operator moving base module 34 from an old storage library frame to a new storage library frame as shown in block 72. The new storage library is then powered up as shown in block 74. Software in the new storage library then detects the down level base module 34 as shown in block 76. Base module 34 is considered down level because it is encoded to enable features in the old storage library.

Upon detecting base module 34, the new storage library prompts for upgrade module 42 as shown in block 78. Upgrade module 42 contains operating instructions for enabling the new features of the new storage library. Upon base module 34 being removed and upgrade module 42 being attached to the new storage library, the new storage library reads the upgrade instructions as shown in block 80. In accordance with the operating instructions contained in upgrade module 42 the additional storage capacity in the new storage library is enabled as shown in block 82. Of course, in addition to storage capacity, other storage library features such as media players and robotic mechanisms could be upgraded from the old storage library to the new storage library. The new storage library then disables upgrade module 42 as shown in block 84 and then prompts for base module 34 as shown in block 86.

The new storage library then determines if the correct module, i.e., base module 34, is attached to the new storage library as shown in decision block 88. If so, the upgrade instructions are then written to base module 34 as shown in block 90. The power up sequence of the new storage library is then continued as shown in block 92 and the new storage library may then operate.

In summary, the method and system of the present invention enable EEPROM module management of the process of unstrapping hardware functions, i.e., allowing the hardware function to execute or be used in some manner. Different levels of hardware functions may be unstrapped (e.g., allowing some consumers more access to functions than other consumers, or allowing only a part of the available function or resource to be made available according to a set of rules such as lease payment vs. purchase payment). Different levels of unstrapped functions may be re-strapped (e.g., when a lease period expires). The rights of the consumer in upgrading storage library 10 may be authenticated (i.e., verifying the rights to use the specific EEPROM module before allowing any unstrapping). This includes re-strapping when an unauthorized use of the EEPROM module is detected. Automatic payment processes may be invoked when unstrapping is requested including single time use, repetitive use, lease to own, and purchase. The present invention also supports batched, aggregated, and delayed delivery of funds by storage on the EEPROM module until a delivery vehicle is available (e.g., when the EEPROM module is used in conjunction with an email or an Internet access application, the financial transaction can be automatically executed before the application is enabled).

Thus it is apparent that there has been provided, in accordance with the present invention, a method and system for providing field scalability across a storage product family that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of upgrading a storage library, the method comprising:
    providing with a storage library a hardware component which has requisite hardware elements used for running the hardware component either at low or high operating levels, wherein the amount of the requisite hardware elements used for running the hardware component at the high operating level is greater than the amount of the requisite hardware elements used for running the hardware component at the low operating level;
    setting the hardware component to run at the low operating level until a software key having permission instructions for the hardware component to run at the high operating level is associated with the storage library;
    associating the software key with the storage library; and
    enabling the hardware component to run at the high operating level in response to the software key being associated with the storage library thereby upgrading the storage library.

2. The method of claim 1 wherein:
    associating the software key with the storage library includes attaching an upgrade module having the software key to the storage library.

3. The method of claim 1 further comprising:
    associating an enabling mechanism with the storage library, the enabling mechanism containing permission instructions for the hardware component of the storage library to run at the low operating level, wherein the enabling mechanism updates the permission instructions for the hardware component to run at the high operating level upon the software key being associated with the storage library.

4. The method of claim 1 wherein:
the hardware component includes a storage array for storing media of the storage library.

5. The method of claim 1 wherein:
the hardware component includes a set of media players for performing operations on media of the storage library.

6. The method of claim 1 wherein:
the hardware component includes a robotic mechanism for manipulating media of the storage library.

7. The method of claim 1 wherein:
associating the software key with the storage library includes associating an EEPROM module having the software key with the storage library.

8. The method of claim 1 wherein:
associating the software key with the storage library includes transferring the permission instructions of the software key from the Internet to the storage library.

9. A system for upgrading a storage library, the system comprising:
a hardware component provided with a storage library, the hardware component having requisite hardware elements used for running the hardware component either at low or high operating levels, wherein the amount of the requisite hardware elements used for running the hardware component at the high operating level is greater than the amount of the requisite hardware elements used for running the hardware component at the low operating level, wherein the hardware component is set to run at the low operating level until enabled to run at the high operating level;
a software key having permission instructions for the hardware component of the storage library to run at the high operating level; and
an enabling mechanism for enabling the hardware component of the storage library to run at the high operating level in response to the software key being associated with the storage library thereby upgrading the storage library.

10. The system of claim 9 wherein:
the enabling mechanism contains permission instructions for the hardware component of the storage library to run at the low operating level, wherein the enabling mechanism updates the permission instructions for the hardware component to run at the high operating level upon the software key being associated with the storage library.

11. The storage library of claim 9 wherein:
the hardware component includes a storage array for storing media of the storage library.

12. The storage library of claim 9 wherein:
the hardware component includes a set of media players for performing operations on media of the storage library.

13. The storage library of claim 9 wherein:
the hardware component includes a robotic mechanism for manipulating media of the storage library.

14. The storage library of claim 9 wherein:
the software key is stored in an EEPROM module.

15. The storage library of claim 9 wherein:
the software key is transferrable to the storage library via the Internet in order for the software key to be associated with the storage library.

16. A method of upgrading a storage library, the method comprising:
associating a base module with a storage library provided with a first storage frame having a first storage capacity, the base module having permission instructions for the storage library to operate at the first storage capacity;
accepting the permission instructions of the base module by the storage library such that the storage library operates at the first storage capacity upon the base module being associated with the storage library;
replacing the first storage frame with a second storage frame having a second storage capacity greater than the first storage capacity;
prompting for a software key, having permission instructions for the storage library to operate at the second storage capacity instead of the first storage capacity, to be associated with the storage library in response to recognizing the permission instructions of the base module for the storage library to operate at the first storage capacity after the first storage frame has been replaced with the second storage frame;
associating the software key with the storage library; and
accepting the permission instructions of the software key by the storage library such that the storage library operates at the second storage capacity upon the software key being associated with the storage library after the first storage frame has been replaced with the second storage frame.

17. The method of claim 16 further comprising:
disabling the software key after the permission instructions of the software key have been accepted by the storage library; and
writing the permission instructions from the storage library into the base module.

18. The method of claim 16 wherein:
each storage frame is a storage array for storing media.

* * * * *